United States Patent
Hurst et al.

(10) Patent No.: US 10,228,387 B2
(45) Date of Patent: Mar. 12, 2019

(54) TWO-DIMENSIONAL MATERIAL-BASED ACCELEROMETER

(71) Applicant: Kulite Semiconductor Products, Inc., Leonia, NJ (US)

(72) Inventors: Adam Hurst, New York, NY (US); Sunwoo Lee, New York, NY (US); James Hone, New York, NY (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 0 days.

(21) Appl. No.: 14/546,877

(22) Filed: Nov. 18, 2014

(65) Prior Publication Data

US 2015/0362521 A1 Dec. 17, 2015

Related U.S. Application Data (60) Provisional application No. 62/012,886, filed on Jun. 16, 2014.

(51) Int. Cl.
*G01P 15/18* (2013.01)
*G01P 15/12* (2006.01)
*G01P 15/125* (2006.01)

(52) U.S. Cl.
CPC ............ *G01P 15/18* (2013.01); *G01P 15/123* (2013.01); *G01P 15/125* (2013.01)

(58) Field of Classification Search
CPC ... G01P 15/12; G01P 15/123; G01P 2015/084
USPC .............. 73/514.35, 514.33, 514.38, 514.18
See application file for complete search history.

(56) References Cited

U.S. PATENT DOCUMENTS

| | | | | | |
|---|---|---|---|---|---|
| 5,679,502 | A | * | 10/1997 | Siddons | G03F 7/2039 205/118 |
| 6,546,800 | B1 | * | 4/2003 | Namerikawa | G01P 15/0922 73/514.34 |
| 2011/0146404 | A1 | * | 6/2011 | Jeung | G01C 25/005 73/514.34 |
| 2013/0001550 | A1 | * | 1/2013 | Seeger | G01L 5/223 257/48 |
| 2013/0111971 | A1 | * | 5/2013 | Pudas | B82Y 15/00 73/12.01 |
| 2013/0133426 | A1 | * | 5/2013 | Park | G01P 15/12 73/514.33 |

(Continued)

FOREIGN PATENT DOCUMENTS

WO    WO 2013192335 A1 * 12/2013 ............... B81B 3/00

*Primary Examiner* — John Fitzgerald
*Assistant Examiner* — Jean Morello
(74) *Attorney, Agent, or Firm* — Troutman Sanders LLP; James E. Schutz; Christopher C. Close, Jr.

(57) ABSTRACT

This disclosure provides systems and methods for a two-dimensional material-based accelerometer. In one embodiment, an accelerometer comprises a substrate; a membrane suspended over an opening in the substrate to form a suspended membrane, wherein the membrane is composed of a two-dimensional material; a mass structure coupled to the suspended membrane; and wherein the mass structure distorts the suspended membrane about a first axis in response to an applied acceleration providing a first change in a conductance of the suspended membrane so that the applied acceleration along the first axis can be detected.

7 Claims, 4 Drawing Sheets

(56) References Cited

U.S. PATENT DOCUMENTS

| | | | |
|---|---|---|---|
| 2013/0273682 A1* | 10/2013 | Cai | H01L 29/0649 438/50 |
| 2015/0020610 A1* | 1/2015 | Hurst | G01L 1/146 73/862.68 |
| 2015/0090043 A1* | 4/2015 | Ruhl | G01N 3/02 73/777 |
| 2015/0108872 A1* | 4/2015 | Pinkerton | B81B 3/00 310/300 |

* cited by examiner

TWO-DIMENSIONAL MATERIAL-BASED ACCELEROMETER

RELATED APPLICATIONS

This application claims priority to and the benefit under 35 U.S.C. § 119(e) of U.S. Provisional Patent Application Ser. No. 62/012,886, filed on June 16, 2014, entitled "Two-Dimensional Material-Based Accelerometer," the contents of which are hereby incorporated by reference in their entirety as fully set forth below.

TECHNICAL FIELD

This disclosure generally relates to accelerometers and more particularly to a two-dimensional material-based accelerometer.

BACKGROUND

Micro-electromechanical (MEMS) sensors constitute an enabling technology that provides a means for measuring physical quantities such as acceleration, pressure, sound, temperature and the like. Such measured physical quantities supplied by MEMS sensors are often used to provide feedback for advanced system controls such as used in jet engines and smart phones. Further, MEMS sensors are used across many industries such as consumer electronics, manufacturing, aerospace, automotive and medical sensing applications.

An ever-persistent objective in many industries that use MEMS sensors typically includes reducing device size while improving performance. Further, the ability to achieve this objective becomes even more challenging as technology matures. MEMS sensors are no exception. One of the most common MEMS sensors is an accelerometer. A state-of-the-art MEMS accelerometer such as used in consumer electronics typically incorporates a capacitive transduction mechanism. A typical MEMS accelerometer features a suspended mass that moves with applied acceleration, where the acceleration is quantified through the change in capacitance between suspended fingers and stationary, comb-drive fingers.

There are several major drawbacks to these state-of-the-art MEMS accelerometers. For example, typical MEMS accelerometers have an inherent scaling limitation due to the resolution of the sensing mechanisms employed. The most commonly employed sensing mechanism in MEMS accelerometers is the capacitive detection mechanism, typically with comb drive fingers or parallel plate capacitors. The typical size of the sensing section alone of a MEMS accelerometer is ~700 µm by ~700 µm, which is fabricated next to the required signal conditioning circuitry bringing the total device size to ~2 mm by ~2 mm. A MEMS microphone may be on the order of ~1 mm by ~1 mm, not including the separate signal conditioning circuit. These capacitive based devices, in addition to piezoresistive, piezoelectric, and optical transduction mechanisms, are not scalable into the nanometer regime because the dynamic range is directly dependent upon the sensor area in addition to other limitations in fabrication and sensitivity (i.e., resolution). In other words, reducing the device size may result in significant reduction in sensor output.

Another significant drawback is the difficulty in CMOS integration. Though it is desirable to have necessary circuits underneath the MEMS structure, typical MEMS accelerometers and microphones are fabricated separately from the circuit die and combined during packaging. Accordingly, incompatible fabrication steps may exist between the two.

Lastly, such large MEMS devices typically possess low resonant frequencies, which limit their linear frequency range, and hence the frequency ranges for input signals. Accordingly, there is a need for improved techniques to allow for further scaling and CMOS integration of MEMS sensors such as accelerometers. In addition, other desirable features and characteristics of the present disclosure will become apparent from the subsequent detailed description and claims, taken in conjunction with the accompanying figures and the foregoing technical field and background.

SUMMARY OF THE DISCLOSURE

Briefly described, embodiments of the present disclosure relate to a two-dimensional material-based accelerometer. According to one aspect, an accelerometer may be configured to include a substrate, a membrane and a mass structure. The membrane may be suspended over an opening in the substrate to form a suspended membrane. Further, the membrane may be composed of a two-dimensional material. The mass structure may be coupled to the suspended membrane. The mass structure may distort the suspended membrane about a first axis in response to an applied acceleration providing a first change in a conductance of the suspended membrane so that the applied acceleration along the first axis can be detected.

According to another aspect, an accelerometer by a process may include transferring and patterning a membrane on a substrate. The membrane may be composed of a two-dimensional material. Further, the process may include depositing and patterning a mass structure on the membrane. Also, the process may include releasing the membrane to form a suspended membrane. The mass structure may distort the suspended membrane about a first axis in response to an applied acceleration providing a first change in a conductance of the suspended membrane so that the applied acceleration along the first axis can be detected.

BRIEF DESCRIPTION OF THE FIGURES

The present disclosure is illustrated by way of examples, embodiments and the like and is not limited by the accompanying figures, in which like reference numbers indicate similar elements. Elements in the figures are illustrated for simplicity and clarity and have not necessarily been drawn to scale. The figures along with the detailed description are incorporated and form part of the specification and serve to further illustrate examples, embodiments and the like, and explain various principles and advantages, in accordance with the present disclosure, where.

DETAILED DESCRIPTION

The following detailed description is merely illustrative in nature and is not intended to limit the present disclosure, or the application and uses of the present disclosure. Furthermore, there is no intention to be bound by any expressed or implied theory presented in the preceding field of use, background, or summary of the disclosure or the following detailed description. The present disclosure provides various examples, embodiments and the like, which may be described herein in terms of functional or logical block elements. Various techniques described herein may be used for a two-dimensional-based accelerometer. The various aspects described herein are presented as methods, devices (or apparatus), and systems that may include a number of components, elements, members, modules, nodes, peripherals, or the like. Further, these methods, devices, and systems may include or not include additional components, elements, members, modules, nodes, peripherals, or the like.

Throughout the specification and the claims, the following terms take at least the meanings explicitly associated herein, unless the context clearly dictates otherwise. The terms "connect," "connecting," and "connected" mean that one function, feature, structure, or characteristic is directly joined to or in communication with another function, feature, structure, or characteristic. The terms "couple," "coupling," and "coupled" mean that one function, feature, structure, or characteristic is directly or indirectly joined to or in communication with another function, feature, structure, or characteristic. Relational terms such as "first" and "second," and the like may be used solely to distinguish one entity or action from another entity or action without necessarily requiring or implying any actual such relationship or order between such entities or actions. The term "or" is intended to mean an inclusive or. Further, the terms "a," "an," and "the" are intended to mean one or more unless specified otherwise or clear from the context to be directed to a singular form. The term "include" and its various forms are intended to mean including but not limited to. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%.

In the following description, numerous specific details are set forth. It is to be understood, however, that embodiments of the disclosed technology may be practiced without these specific details. References to "one embodiment," "an embodiment," "example embodiment," "various embodiments," and other like terms indicate that the embodiments of the disclosed technology so described may include a particular function, feature, structure, or characteristic, but not every embodiment necessarily includes the particular function, feature, structure, or characteristic. Further, repeated use of the phrase "in one embodiment" does not necessarily refer to the same embodiment, although it may.

This disclosure describes a novel two-dimensional material-based accelerometer. In one embodiment, the accelerometer may comprise a suspended membrane (i.e., a two-dimensional material) supporting a mass. In one embodiment, the two-dimensional material may comprise one dimension (e.g., thickness) that is a single atomic layer to several atomic layers. For example, graphene, molybdenum disulfide ($MoS_2$), tungsten diselenide ($WSe_2$), or various other materials may be used as a two-dimensional material in an embodiment of the presently disclosed accelerometer.

Compared to current MEMS technology, graphene along with other two-dimensional materials possess a charge-dependent conductance that is highly advantageous as it may transduce the mechanical motion to the electrical domain with an efficiency that is several orders of magnitude larger than the capacitive-based transduction scheme. Such advantages improve performance (i.e., sensitivity) and allow size reduction down to the nanoscale. Such desirable mechanical and electrical properties make graphene one of several ideal materials for NEMS applications. Further, it is possible to synthesize certain two-dimensional materials (e.g., graphene) using a chemical vapor deposition scheme, which has a quality comparable to that of naturally formed, mechanically exfoliated graphene as described. Additionally, when combined with various transfer techniques, it is generally possible to integrate the two-dimensional based accelerometers disclosed herein with virtually any pre-existing technology.

In one embodiment, the accelerometer may further comprise a local or global gate, which may become electrically charged. In one embodiment, the membrane supporting the mass (i.e., mass structure) may be positioned such that there is a distance between the gate and the membrane. According to one embodiment of the present disclosure, an acceleration exerts a force on the mass on top of the suspended membrane comprising the two-dimensional material. Generally, the product of this acceleration and the suspended mass causes the suspended membrane to deflect, which changes the distance between the membrane and the gate.

Assuming the gate is electrically charged, the change in distance generates a change in capacitance between the membrane and the gate. The change in capacitance, which is a change in the electrical coupling between the electrically charged gate and the membrane, causes the carrier concentration of the suspended membrane to change. This change in carrier concentration results in a direct change in the resistance of the two-dimensional material, which can readily be measured. For example, in one embodiment, the mass structure may distort the suspended membrane about an axis (i.e., a first, second, or third axis) in response to an applied acceleration providing a change (i.e., a first, second, or third change) in a conductance of the suspended membrane so that the applied acceleration along the respective axis can be detected.

A two-dimensional material based nano-electromechanical (NEMS) accelerometer, as disclosed herein, overcomes two major challenges in typical MEMS based accelerometers: scaling and sensitivity. As discussed, this novel transduction mechanism exploits the transconductive properties of two-dimensional materials (e.g., graphene) and allows for improved sensitivities at substantially reduced device sizes ($\sim 10^{-9}$ m) as two-dimensional materials exhibit excellent mechanical strength and possesses exceptional electrical properties. Put differently, two-dimensional materials such as graphene are zero-bandgap semiconductors with extremely high mobility.

Figure 1:
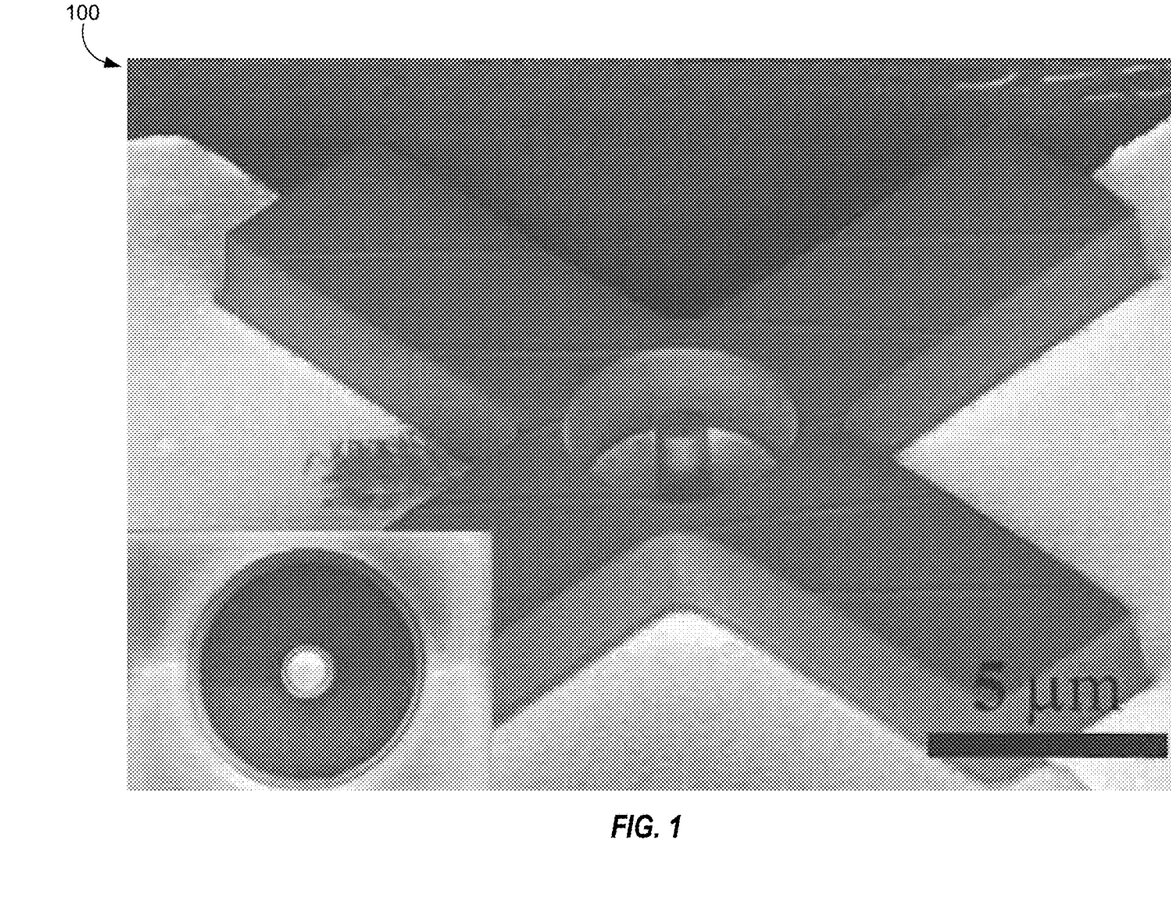
FIG. 1 is a scanning electronic microscope (SEM) image of one embodiment of an accelerometer in accordance with various aspects of the present disclosure.
Figure 2:
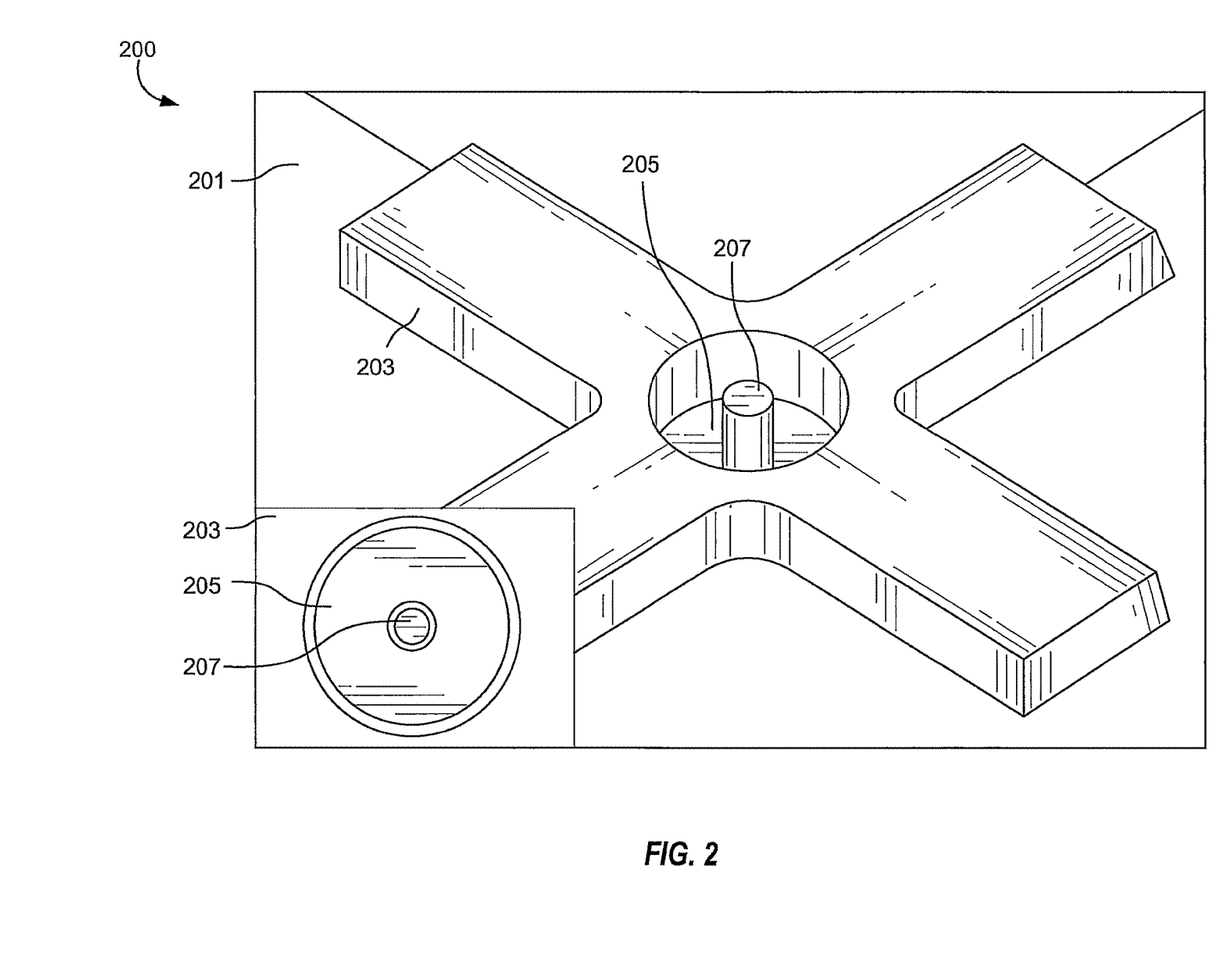
FIG. 2 is an image of a representative embodiment of an accelerometer in accordance with various aspects of the present disclosure.

As noted above, the accelerometer disclosed herein includes a suspended two-dimensional material membrane (i.e., diaphragm) with a mass structure at the center of it, and when exposed to acceleration, the diaphragm or suspended membrane deflects under the load formed by the product of the acceleration and the mass structure. FIG. 1 is a scanning electronic microscope (SEM) image of one embodiment of an accelerometer 100 in accordance with various aspects set forth herein. FIG. 2 shows a representative accelerometer 200, configured similarly to the accelerometer 100 shown in FIG. 1.

As shown in FIG. 2, the accelerometer 200 may comprise a suspended membrane 205 supporting a mass structure 207. The suspended membrane 205 may be circular graphene or any other two-dimensional material. For example, the two-dimensional material may comprise one dimension (e.g., thickness) that is a single atomic layer to several atomic layers, and in addition to graphene, materials such as molybdenum disulfide ($MoS_2$), tungsten diselenide ($WSe_2$), and other suitable materials may be utilized. Further, in one embodiment, the mass structure 207 may comprise an epoxy-based photoresist such as, for example, SU-8. According to one embodiment, the mass structure 207 may be positioned (i.e., patterned) in or around the center of the suspended membrane 205, but the mass structure 207 may be positioned anywhere on the suspended membrane 205.

As further shown in FIG. 2, in one embodiment, the suspended membrane 205 may be clamped on all sides using a clamping structure, such as clamping structure 203 (i.e., the clamping structure 203 may be disposed around the suspended membrane 205). For example, in one embodiment and as shown in FIG. 2, the clamping structure 203 may define a circular pattern of the suspended membrane 205. Similar to the mass structure 207, the clamping structure 203 may be structured with an epoxy (e.g., SU-8 photoresist). Along with SU-8, the mass structure 207 and the clamping structure 203 any other material depending on the required range of operation. As will be understood and appreciated, using more dense materials such as metals will make the device (e.g., 200) more sensitive. In example embodiments, the mass structure 207 may be structured while patterning the clamping structure 203, thus limiting fabrication steps.

Additionally, in one embodiment, the accelerometer 200 may be configured such that metal pads (unshown) make electrical contact with the suspended membrane 205 for electrical reading of changes in resistance of the accelerometer 200 with acceleration. Further, as shown in FIG. 2, the accelerometer 200 may be configured to include a substrate 201. In one embodiment, the structure comprising the membrane 205, the mass structure 207, and the clamping structure 203 may be fabricated on a substrate 201 made of silicon or fused silica. In addition to silicon or fused silica, the substrate 201 may comprise various other suitable materials. Further, in example embodiments, the structure comprising the membrane 205, the mass structure 207, and the clamping structure 203 may be implemented on a conventional CMOS die through post-processing. As will be appreciated, CMOS die typically contain circuitries for supporting accelerometers (e.g., accelerometer 200), which may allow for 3D scaling.

In example embodiments, the accelerometer 200 may be designed to operate within a linear mechanical regime. Accordingly, controlling a pretension of the suspended membrane 205 may affect the accelerometer's 200 sensitivity, dynamic range, linear response, resonant frequency and the like. In one embodiment, the pretension of the suspended membrane 205 may be tuned based on the clamping structure 203 as well as a placement of the mass structure 207. For example, in one embodiment, thermal processing on SU-8 clamping (e.g., clamping structure 203) may allow for tuning of the pretension of the suspended membrane 205, as is discussed in S. Lee et al., *Electrically integrated SU-8 clamped graphene drum resonators for strain engineering*, Applied Physics Letters, 102(15): p. 153101 (2013), which is incorporated herein by reference. As will be appreciated, while accelerometers comprising smaller diameter (1 µm-10 µm) graphene drum accelerometers, which exhibit high resonant frequencies, are well suited for high-g applications such as ballistics testing, larger drums with heavier metallic masses perform well for low-g applications such as consumer electronics.

Figure 3:
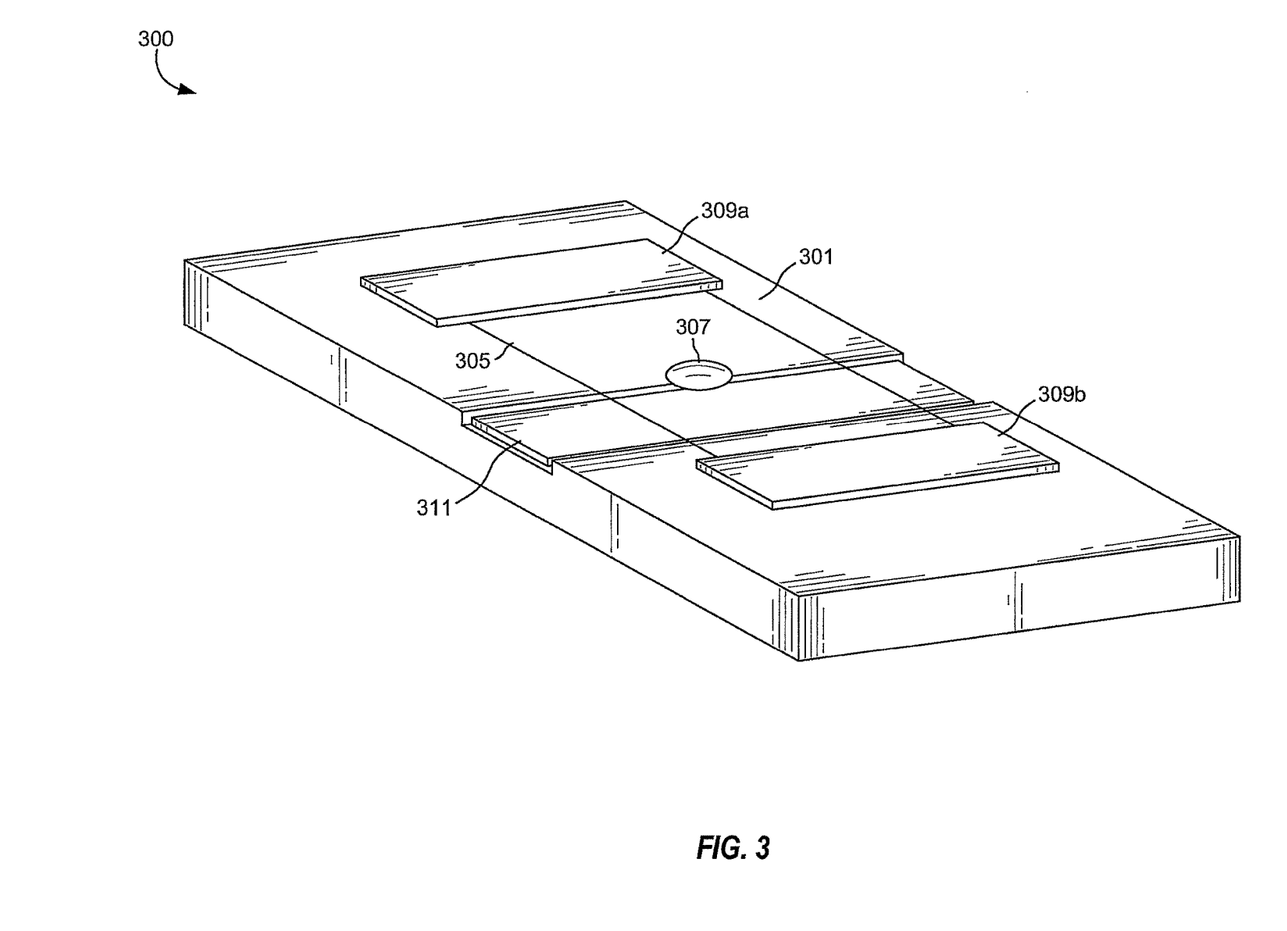
FIG. 3 illustrates another embodiment of an accelerometer in accordance with various aspects of the present disclosure.

While the accelerometer 200 shown in FIG. 2 exhibits a clamped structure, other embodiments of an accelerometer may include a suspended two-dimensional material membrane over a channel or rectangular trench. For example, FIG. 3 illustrates another embodiment of an accelerometer 300 in accordance with various aspects set forth herein. In FIG. 3, the accelerometer 300 may be configured to include a substrate 301 and a suspended membrane 305. For example, in one embodiment, the membrane 305 may be suspended over an opening in the substrate 301, thus creating a suspended membrane (e.g., 305). Further, as shown in FIG. 3, in one embodiment, an accelerometer 300 may comprise a mass structure 307, which may be coupled to the membrane 305, as discussed previously. In one embodiment, the accelerometer 300 may further comprise one or more contacts (e.g., 309*a* and 309*b*) and an electrode 311, which may be coupled to the membrane 305. In one embodiment, the electrode 311 may be a local back gate electrode. Further, in one embodiment, the accelerometer 300 may be configured to include a second electrode, which may be coupled to the membrane 305 such that the second electrode is approximately opposite to a first electrode (i.e., electrode 311).

As shown in FIG. 3, the mass structure 307 may have a circular pattern (i.e., a circular cross section). But, as discussed in relation to FIG. 2, the mass structure 307 may be patterned in any suitable geometry such as, but not limited to, a rectangular pattern, polygonal pattern, etc. Further, though the accelerometer 300 shown in FIG. 3 has a mass structure 307 positioned in the center of the suspended membrane 305, in example embodiments, the mass structure 307 may be positioned elsewhere. Generally, depending on the purpose of the accelerometer 300, the mass structure 307 may be positioned to minimize or maximize the sensitivity of the mass structure 307 to off-axis acceleration.

Further, though the present disclosure primarily relates to the use of this transduction mechanism for sensing acceleration, it should be noted that the device architecture disclosed herein could be used in traditional transduction mechanisms (e.g., traditional transduction mechanisms of capacitance, piezoresistance, or the piezoelectric effect). For instance, all aforementioned two-dimensional materials exhibit a basic piezoresistive effect, which will result in a change in resistance with acceleration due to the deflection-induced strain in a membrane with acceleration (though smaller in their signal magnitudes compared to the transconductive signal). Accordingly, various potential transduction mechanisms capable of translating acceleration into an electrical output may be considered that can be employed with a two-dimensional material-based accelerometer (e.g., 200 or 300). For example, a transduction mechanism that uses a capacitance change between a membrane and a local or global gate can be employed with a two-dimensional material-based accelerometer, as described herein. Further, a transduction mechanism that uses a resistance change of the device, wherein resistance changes can be recorded by variations in the current or voltage output from the device, via the transconductive properties of various two-dimensional materials may be employed with a two-dimensional material-based accelerometer.

Likewise, a transduction mechanism that uses a resistance change via a simple change in geometry due to the elongation of the membrane (i.e., a conventional piezoresistive effect typically with low gauge factor) can be employed with a two-dimensional material-based accelerometer as discussed here. Further, a transduction mechanism that uses a significant resistance change with strain that may exist in some semiconductor two-dimensional materials with a bandgap, such as $MoS_2$ (i.e., a semiconductor piezoresistive effect with high gauge factor) may be employed with a two-dimensional material-based accelerometer. Additionally, a transduction mechanism that uses an in-plane piezoelectric effect that outputs electric charges with acceleration-induced strain in certain two-dimensional materials, such as $MoS_2$, may be employed with a two-dimensional material-based accelerometer as discussed herein.

Also, a transduction mechanism that utilizes an effect created when the suspended two-dimensional material supporting a mass is driven to its resonance via an AC electrical stimulus to the gate, such that acceleration can be measured by observing shifts in the device resonance or the magnitude of the resonance as the tension in the membrane changes with acceleration, which mimics a graphene resonator (similar to those described in Lee, S., et al., *Electrically integrated SU-8 clamped graphene drum resonators for strain engineering*, Applied Physics Letters, 102(15): p. 153101 (2013), which is incorporated herein by reference), may be employed with a two-dimensional material-based accelerometer. Finally, a transduction mechanism that utilizes deflection measured optically via a Fabry-Perot interferometry in which reflected light from the deflecting membrane results in variations in intensity that directly correlate with acceleration may be employed with a two-dimensional material-based accelerometer as discussed herein.

Figure 4:
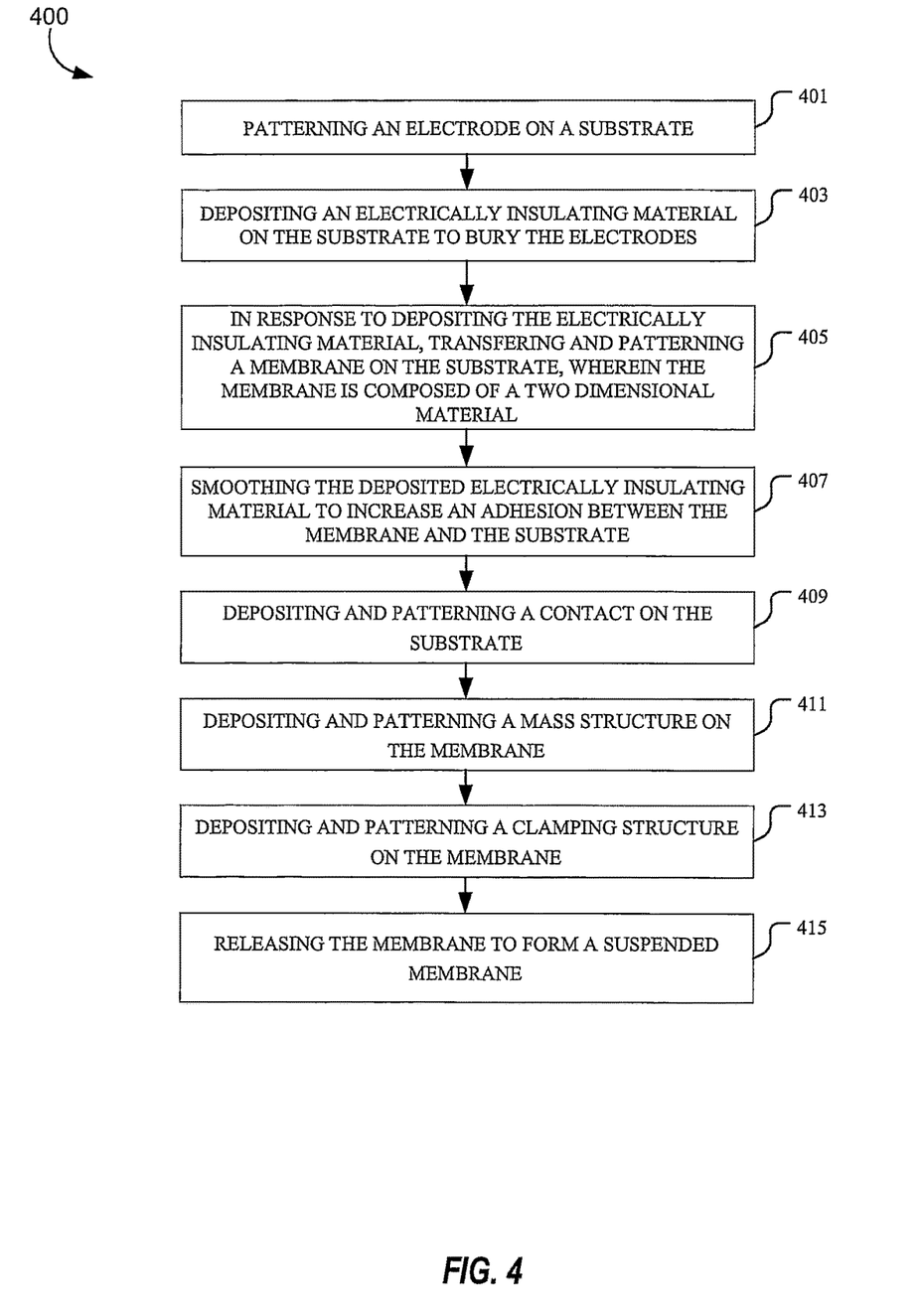
FIG. 4 is a flowchart of an accelerometer by a process in accordance with various aspects of the present disclosure.

FIG. 4 is a flowchart of an accelerometer by a process 400 in accordance with various aspects set forth herein. The accelerometer by the process 400 may include a semiconductor fabrication process that may be used in making various types of accelerometers disclosed herein (e.g., 200 or 300). In FIG. 4, the process 400 may start, for instance, at block 401, where it may include patterning an electrode such as a local back-gate electrode composed of a metal or some other material. This step may be skipped if, for instance, a global back-gate electrode is used with a low-resistivity silicon wafer or the like. At block 403, the process 400 may include depositing an electrically insulating material to bury the electrode. The electrode, whether global or local, may be buried under the electrically insulating material such as silicon dioxide. Following the insulator deposition, at block 405, the process 400 may include transferring and patterning a membrane (e.g., a two-dimensional material like graphene) on the substrate wafer using photolithography, electron beam lithography, or other patterning method. At block 407, the process 400 may include smoothing the deposited electrically insulating material in order to promote an adhesion between the membrane and the substrate. In one embodiment, techniques such as chemical mechanical polishing may be used to smooth the deposited electrically insulating material. At block 409, the process 400 may include depositing and patterning a contact or a mass on the substrate using lithography and metal deposition. The contact or the mass may be composed of metal, according to one embodiment. At block 411, the process 400 may include depositing and patterning a mass structure on the membrane. At block 413, the process 400 may include depositing and patterning a clamping structure on the membrane. At block 415, the process 400 may include releasing the membrane to form a suspended membrane. In one example, the membrane, including its masses, may be released using a wet etch (e.g., a buffered oxide etch) and consequent critical point drying to reduce stiction. A person of ordinary skill in the art will recognize various techniques for fabricating MEMS devices.

In another embodiment, an accelerometer by a process may include transferring and patterning a membrane on a substrate. The membrane may be composed of a two-dimensional material. Further, the process may include depositing and patterning a mass structure on the membrane. Also, the process may include releasing the membrane to form a suspended membrane. The mass structure may distort the suspended membrane about a first axis in response to an applied acceleration providing a first change in a conductance of the suspended membrane so that the applied acceleration along the first axis can be detected.

In yet another embodiment, the accelerometer by the process may include patterning electrodes on the substrate. Further, in one embodiment, the accelerometer by the process may include depositing an electrically insulating material on the substrate to bury the electrodes. Likewise, the accelerometer by the process may include transferring and patterning the membrane on the substrate responsive to depositing the electrically insulating material, according to one embodiment. Finally, in one embodiment, the accelerometer by the process may include smoothing the deposited electrically insulating material to increase an adhesion between the membrane and the substrate and/or depositing and patterning a contact on the substrate.

It is important to recognize that it is impractical to describe every conceivable combination of components or methodologies for purposes of describing the claimed subject matter. However, a person having ordinary skill in the art will recognize that many further combinations and permutations of the subject technology are possible. Accordingly, the claimed subject matter is intended to cover all such alterations, modifications, and variations that are within the spirit and scope of the claimed subject matter.

Although the present disclosure describes specific examples, embodiments, and the like, various modifications and changes may be made without departing from the scope of the present disclosure as set forth in the claims below. For example, although the example methods, devices and systems, described herein are in conjunction with a configuration for the aforementioned two-dimensional material-based accelerometer, the skilled artisan will readily recognize that the example methods, devices or systems may be used in other methods, devices or systems and may be configured to correspond to such other example methods, devices or systems as needed. Further, while at least one example, embodiment, or the like has been presented in the foregoing detailed description, many variations exist. Accordingly, the specification and figures are to be regarded in an illustrative rather than a restrictive sense, and all such modifications are intended to be included within the scope of the present disclosure. Any benefits, advantages, or solutions to problems that are described herein with regard to specific embodiments are not intended to be construed as a critical, required, or essential feature or element of any or all of the claims. Any benefits, advantages, or solutions to problems that are described herein with regard to specific examples, embodiments, or the like are not intended to be construed as a critical, required, or essential feature or element of any or all of the claims.

What is claimed is:

1. An accelerometer device assembly comprising:
   a substrate;
   a membrane suspended over an opening in the substrate to form a suspended membrane having a suspended portion and a fixed portion, wherein the membrane is composed of a two-dimensional material;

a mass structure coupled to the suspended portion of the suspended membrane;

an electrically charged gate positioned such that there is a distance between the gate and the membrane;

a first electrode coupled to the membrane at least partially at the fixed portion;

a second electrode coupled to the membrane at least partially at the fixed portion and substantially opposite to the first electrode; and a clamping structure disposed around the suspended membrane, the clamping structure defining a circular pattern of the membrane, and the clamping structure comprising four legs each projecting away from the circular pattern of the membrane and being substantially equally offset from two adjacent legs, wherein an applied acceleration on the mass structure distorts the membrane about a first axis, the distortion of the membrane about the first axis changing the distance between the gate and the membrane from a first distance to a second distance, and the change from the first distance to the second distance causing a change in conductance of the membrane that allows detection of the applied acceleration about the first axis, the change in conductance is measured as a current and voltage at the first and second electrodes.

2. The accelerometer device assembly of claim 1, wherein the two-dimensional material is graphene.

3. The accelerometer device assembly of claim 1, wherein the mass structure is composed of a photoresist.

4. The accelerometer device assembly of claim 1, wherein a cross-section of the mass structure is circular.

5. The accelerometer device assembly of claim 1 further comprising a clamping structure disposed around the suspended membrane and clamping at least a portion of the fixed portion.

6. The accelerometer device assembly of claim 1, wherein the mass structure is positioned at about a center of the membrane.

7. The accelerometer device assembly of claim 1, wherein the suspended membrane has a pretension that is tuned at least in part based on the clamping structure.

* * * * *